United States Patent
Hale et al.

(10) Patent No.: US 9,551,443 B2
(45) Date of Patent: Jan. 24, 2017

(54) ENGINE FLUID LINE WITH FLEXIBLE JOINT

(71) Applicant: Ford Global Technologies, LLC, Dearborn, MI (US)

(72) Inventors: Anthony Shane Hale, Plymouth, MI (US); William Michael Sanderson, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 62 days.

(21) Appl. No.: 14/183,956

(22) Filed: Feb. 19, 2014

(65) Prior Publication Data

US 2015/0233505 A1 Aug. 20, 2015

(51) Int. Cl.
  *F16L 27/12* (2006.01)
  *F16L 21/03* (2006.01)
  *F16L 9/02* (2006.01)
  *F16L 27/02* (2006.01)
  *F16L 27/10* (2006.01)

(52) U.S. Cl.
  CPC ............ *F16L 21/03* (2013.01); *F16L 9/02* (2013.01); *F16L 27/026* (2013.01); *F16L 27/1017* (2013.01); *Y10T 137/9138* (2015.04)

(58) Field of Classification Search
  USPC ........ 285/298, 302, 32, 145.1, 145.4, 121.1, 285/98, 121.2, 223, 347
  See application file for complete search history.

(56) References Cited

U.S. PATENT DOCUMENTS

| | | | | |
|---|---|---|---|---|
| 2,467,911 A | * | 4/1949 | Reilly | ............ F16L 27/12 285/302 |
| 2,532,773 A | * | 12/1950 | Kellam | ............ F16L 37/248 174/99 B |
| 2,956,823 A | * | 10/1960 | Benjamin, Jr. et al. | ...... 285/298 |
| 3,885,821 A | * | 5/1975 | Philibert | .............. 285/149.1 |
| 2010/0244441 A1 | | 9/2010 | Quesada et al. | |

* cited by examiner

*Primary Examiner* — Aaron Dunwoody
(74) *Attorney, Agent, or Firm* — Greg P. Brown; Price Heneveld LLP

(57) ABSTRACT

A vehicle fluid line for transporting high and low pressure fluids of an engine includes a rigid pipe having opposing ends configured to fixedly couple with the engine. An adjustable joint divides a length of the rigid tube into first and second segments. The adjustable joint has a cylindrical housing coupled with the first segment and having an inner diameter. A stop feature protrudes from an outer diameter of the second segment and interfaces with the cylindrical housing to prevent disengagement of the second segment from the housing. An elastomeric grommet is seated between the inner and outer diameters and is configured to maintain a fluid seal that allows the second segment to rotate axially, pivot radially, and slide longitudinally within the cylindrical housing.

20 Claims, 5 Drawing Sheets

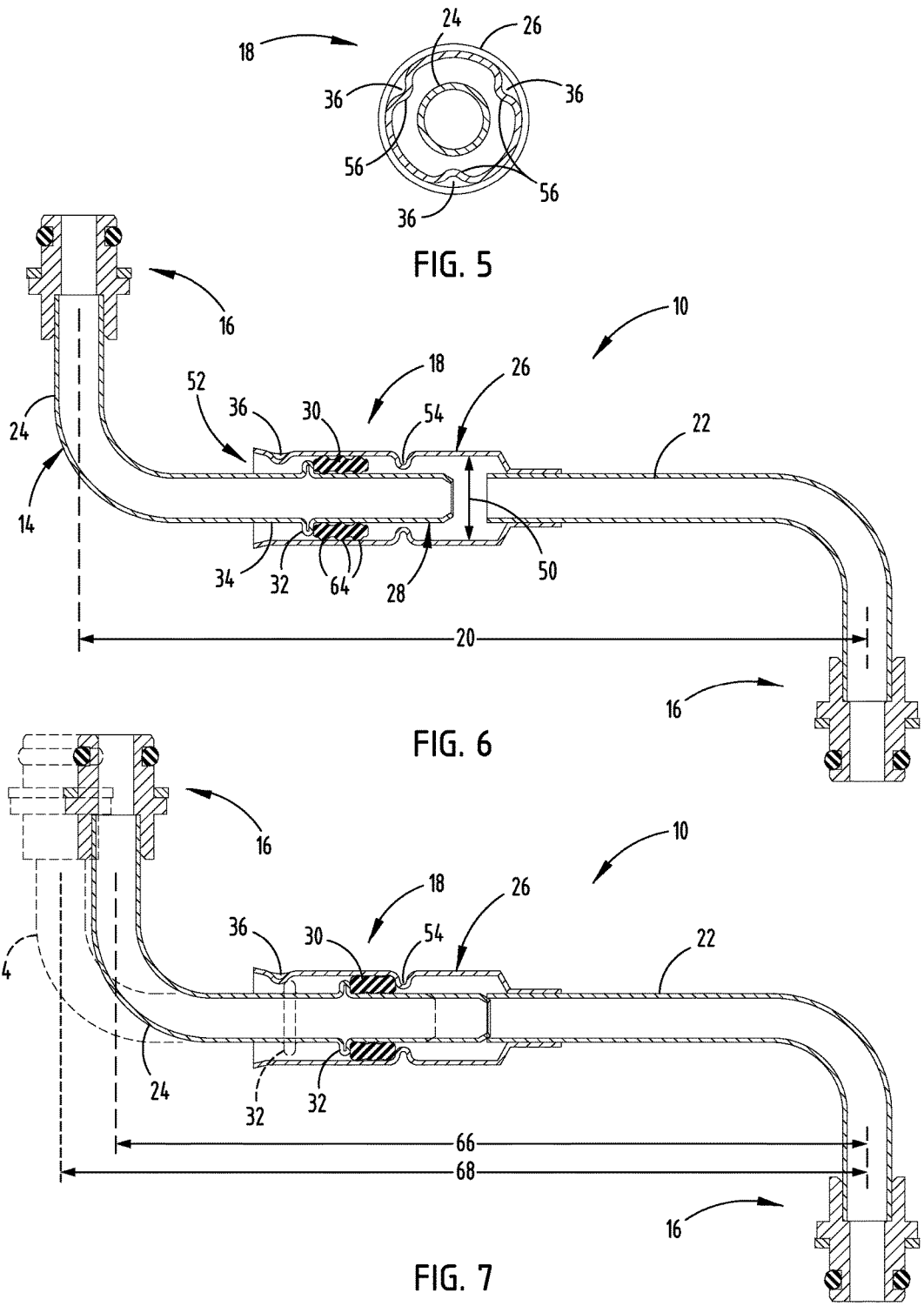

ENGINE FLUID LINE WITH FLEXIBLE JOINT

FIELD OF THE INVENTION

The present invention generally relates to a flexible engine fluid line, and more particularly to a flexible joint for a vehicle engine fluid line.

BACKGROUND OF THE INVENTION

It is generally understood that vehicle engines have various fluid lines, including those that transport oil, coolant, and other potentially high pressure fluids. Typically, high production vehicles utilize flexible hoses that accommodate thermal distortion between components of the engine, as well as production variances that result in inconsistent locations and positions of the connection points for fluid transportation. These flexible hoses can have a relatively high cost and in some cases can have decreased performance near local high temperature heat sources. Alternatively, rigid fluid lines can be difficult to implement in high production vehicles.

SUMMARY OF THE INVENTION

According to one aspect of the present invention, a vehicle fluid line for transporting high pressure fluids of an engine includes a rigid pipe having opposing ends configured to fixedly couple with the engine. An adjustable joint divides a length of the rigid pipe into first and second segments. The adjustable joint has a cylindrical housing coupled with the first segment. A stop feature protrudes from an outer diameter of the second segment and interfaces with the cylindrical housing to prevent disengagement of the second segment from the housing. An elastomeric grommet is seated between an inner diameter of the cylindrical housing and the outer diameter of the second segment and is configured to maintain a fluid seal that allows the second segment to rotate and slide longitudinally within the cylindrical housing.

According to another aspect of the present invention, a vehicle fluid line includes a rigid pipe and a fluid sealed, adjustable joint dividing a length of the rigid pipe into first and second segments. The joint has a housing coupled with the first segment. The joint also includes an end portion of the second segment slidably and rotatably engaged within the housing. A protrusion on the end portion and a catch on the housing interface to limit slidable adjustment of the length.

According to yet another aspect of the present invention, a vehicle fluid line includes first and second segments of a rigid pipe. A housing is coupled with an end of the first segment, and an end portion of the second segment is rotatably and slidably engaged within a cylindrical cavity of the housing. A grommet is disposed between the end portion and the cylindrical cavity forming a seal. A protrusion on an exterior of the end portion prevents disengagement of the housing from the end portion.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5 is a cross-sectional end view of a housing of the vehicle fluid line, taken at line V-V of FIG. 3;

FIG. 6 is a cross-sectional side view of the vehicle fluid line taken along the length of the vehicle fluid line of FIG. 2;

FIG. 7 is a cross-sectional side view of the vehicle fluid line of FIG. 6, showing longitudinal adjustment of the length of the vehicle fluid line;

DETAILED DESCRIPTION OF THE PREFERRED EMBODIMENTS

Figure 1:
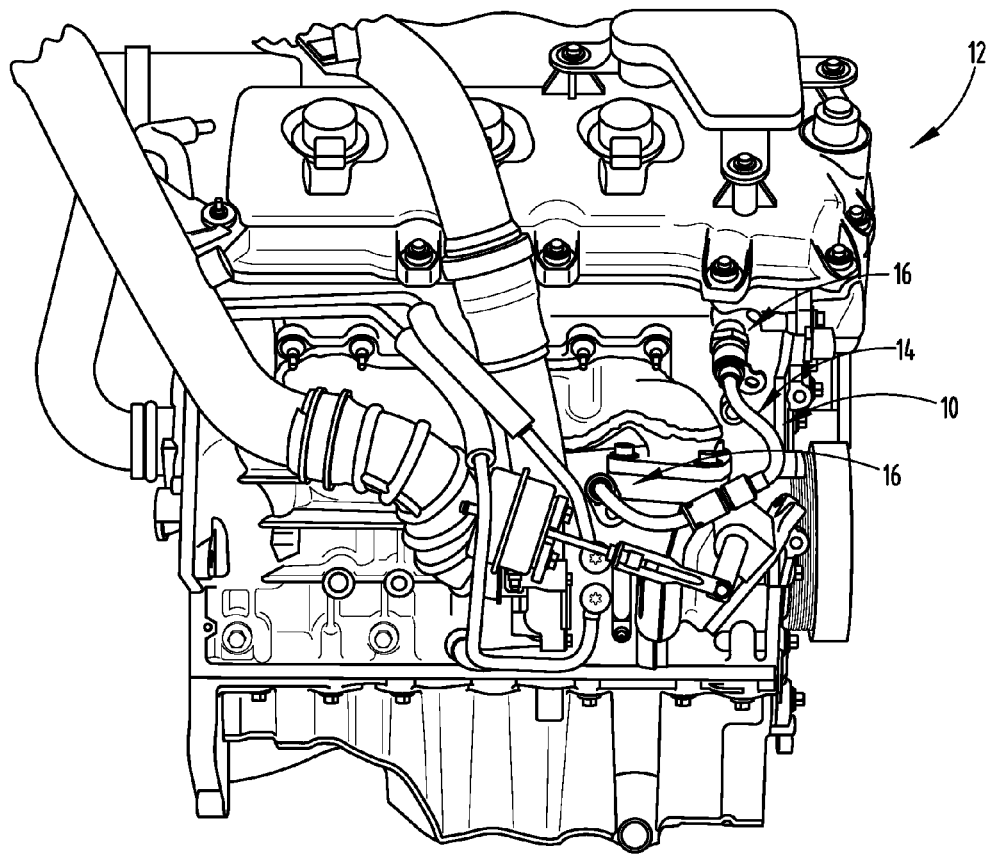
FIG. 1 is an elevated side view of an engine having a vehicle fluid line, according to one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-9, reference numeral 10 generally designates a vehicle fluid line for transporting high pressure fluids of an engine 12. The vehicle fluid line 10 includes a rigid pipe 14 having opposing ends 16 configured to fixedly couple with the engine 12. An adjustable joint 18 divides a length 20 of the rigid pipe 14 into a first segment 22 and a second segment 24. The adjustable joint 18 has a housing 26 coupled with the first segment 22 and an end portion 28 of the second segment 24 slidably and rotatably engaged within the housing 26. An elastomeric grommet 30 is seated between the housing 26 and the end portion 28 of the second segment 24 to maintain a seal that allows the second segment 24 to rotate and slide longitudinally within the housing 26. A stop feature 32 protrudes from an outer diameter 34 of the second segment 24 and interfaces with a catch feature 36 within the housing 26 to limit slidable adjustment of the length 20 and prevent disengagement of the second segment 24 from the housing 26. The stop feature 32 additionally interfaces with the elastomeric grommet 30 during installation and operation, keeping the elastomeric grommet 30 from being displaced out of the housing 26.

Referring now to FIG. 1, one embodiment of the vehicle fluid line 10 is shown with the opposing ends 16 thereof attached between connection ports on a cylinder head and a turbocharger of the engine 12 for supplying coolant to the turbocharger of a vehicle. It is contemplated that the vehicle fluid line 10 may be alternatively arranged to dispense coolant from the turbocharger or to transport oil to/from the turbocharger. It is also conceivable that in additional embodiments the vehicle fluid line 10 may be attached to other components within a vehicle system for transporting various liquids.

Figure 1A:
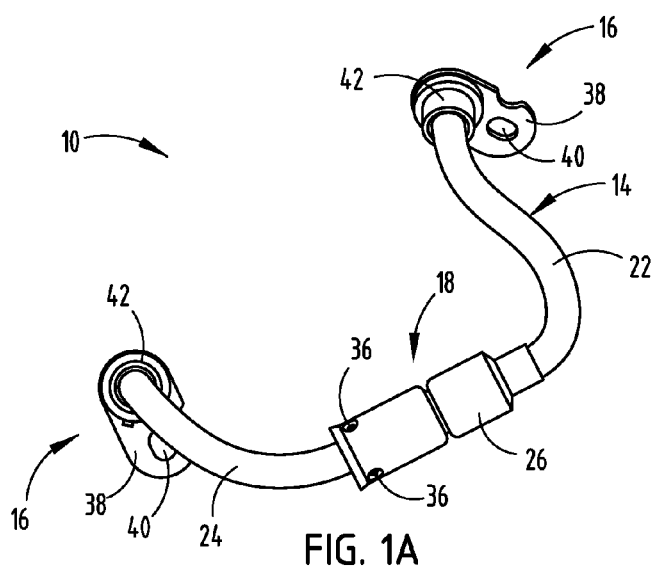
FIG. 1A is an elevated side view of the vehicle fluid line of FIG. 1.

As also shown in FIGS. 1-1A, the opposing ends 16 of the vehicle fluid line 10 are rigidly coupled with the respective component of the engine 12 to provide rigid connections therebetween. To secure and reinforce the rigid connections, the opposing ends 16 each include an attachment bracket 38 having an aperture 40 for securing a fastener to the respective component of the engine 12. In addition, the rigid connectors are provided with low tolerance fitting couplings 42 that have gaskets to ensure the rigid connections are liquid sealed and stable under high and low pressures. It is contemplated that other reinforcement, attachment, or sealing measures may be included on the opposing ends 16 to further reinforce the rigid connections or adapt to the required tube geometry, as generally understood by one having ordinary skill in the art. The first and second segments 22, 24 of the rigid pipe 14 extend from the opposing ends 16 in a predefined, fixed curvature and comprise a generally tubular conduit having a substantially consistent diameter and thickness along the length 20 (FIG. 6) of the rigid pipe 14, as further described below. Accordingly, the rigid pipe 14 in one embodiment is made of stainless steel, and in other embodiments may be made of other rigid and otherwise compatible materials, such as aluminum, steel, or plastic composites.

The embodiment of the vehicle fluid line 10 shown in FIG. 1 is illustrated in greater detail in FIG. 1A, showing the adjustable joint 18 between the first and second segments 22, 24 to allow for longitudinal, radial, and axial movement that accommodates thermal distortion and production variance in the location and orientation of the connection ports on the engine 12. In the embodiment illustrated in FIG. 1, there may be 2 to 5 millimeters of variation between the connection ports resulting from production variances, and more typically 3 to 4 millimeters of variation of production variance in assembly. Also, during operation of the engine 12, thermal distortion may cause up to 5 millimeters of additional distortion between the connection ports of the illustrated embodiment, and potentially more variance from thermal distortion in additional embodiments. The adjustable joint 18 is also configured to accommodate for tolerance variances in the length 20 (FIG. 6) of the rigid pipe 14 of the vehicle fluid line 10.

Figure 2:
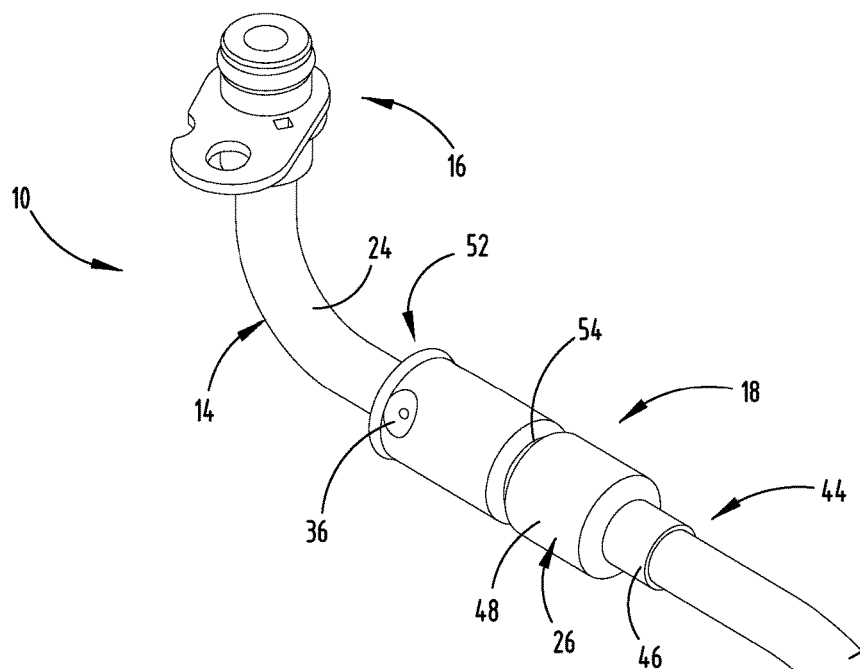
FIG. 2 is a top perspective view of a vehicle fluid line, according to an additional embodiment of the present invention.
Figure 3:
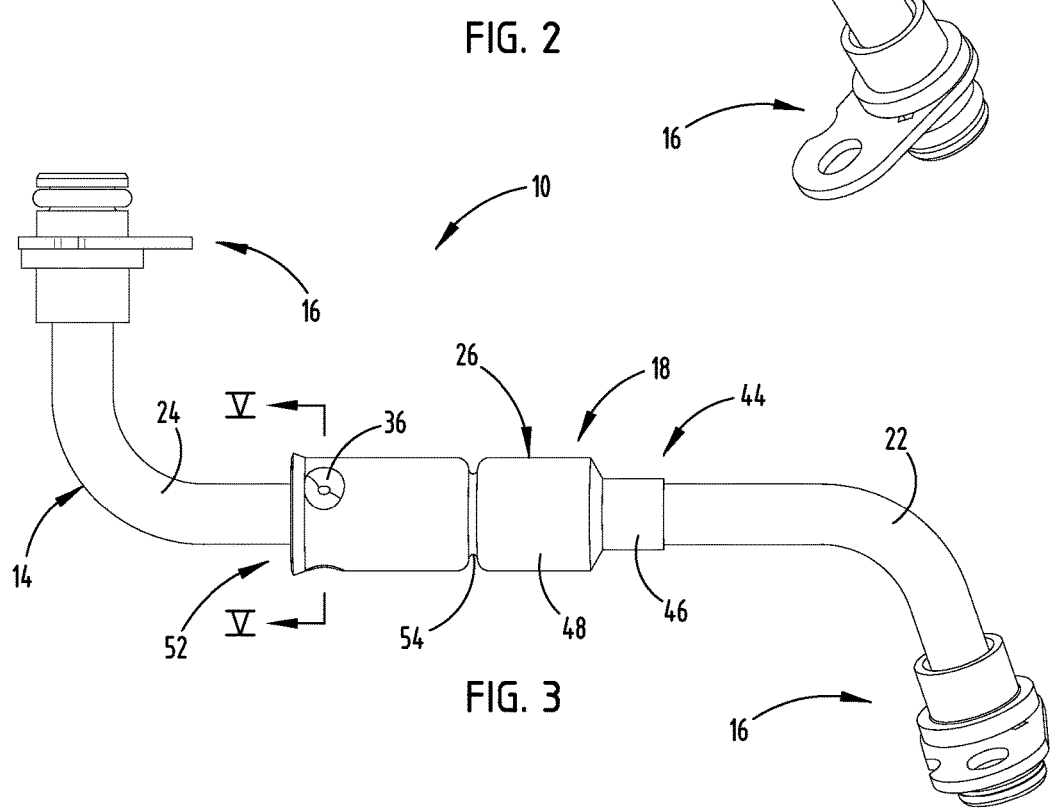
FIG. 3 is an elevated side view of the vehicle fluid line of FIG. 2.

Referring now to FIGS. 2-9, which illustrate an additional embodiment of the vehicle fluid line 10 having an alternative predefined fixed curvature of the first and second segments 22, 24 of the rigid pipe 14. As shown in FIGS. 2-3, the first and second segments 22, 24 may have differentiating predefined fixed curvatures to accommodate the intended use of the vehicle fluid line 10. The adjustable joint 18 that divides the rigid pipe 14 into the first and second segments 22, 24 includes the cylindrical housing 26 fixedly coupled with an end 44 of the first segment 22. More specifically, the housing 26 includes a connecting portion 46 having an inside diameter substantially equivalent to an outside diameter of the first segment 22 proximate the end 44 thereof. The connecting portion 46 is integrally attached to a body portion 48 of the cylindrical housing 26, which has a greater inner diameter 50 (FIG. 6) than the inside diameter of the connecting portion 46. The body portion 48 of the cylindrical housing 26 has a substantially tubular shape with an open end 52 opposite the connecting portion 46 for receiving the second segment 24 of the rigid pipe 14. The catch feature 36 is formed on the body portion 48 of the cylindrical housing 26 proximate the open end 52 for retaining the second segment 24 within the body portion 48. Also, the body portion 48 of the housing 26 includes an internal seal stop 54 that protrudes radially inward from the inner diameter 50 thereof between the catch feature 36 and the connecting portion 46 of the cylindrical housing 26. It is conceivable that the housing 26 in additional embodiments may be integrally formed into the second segment 22.

Figure 4:
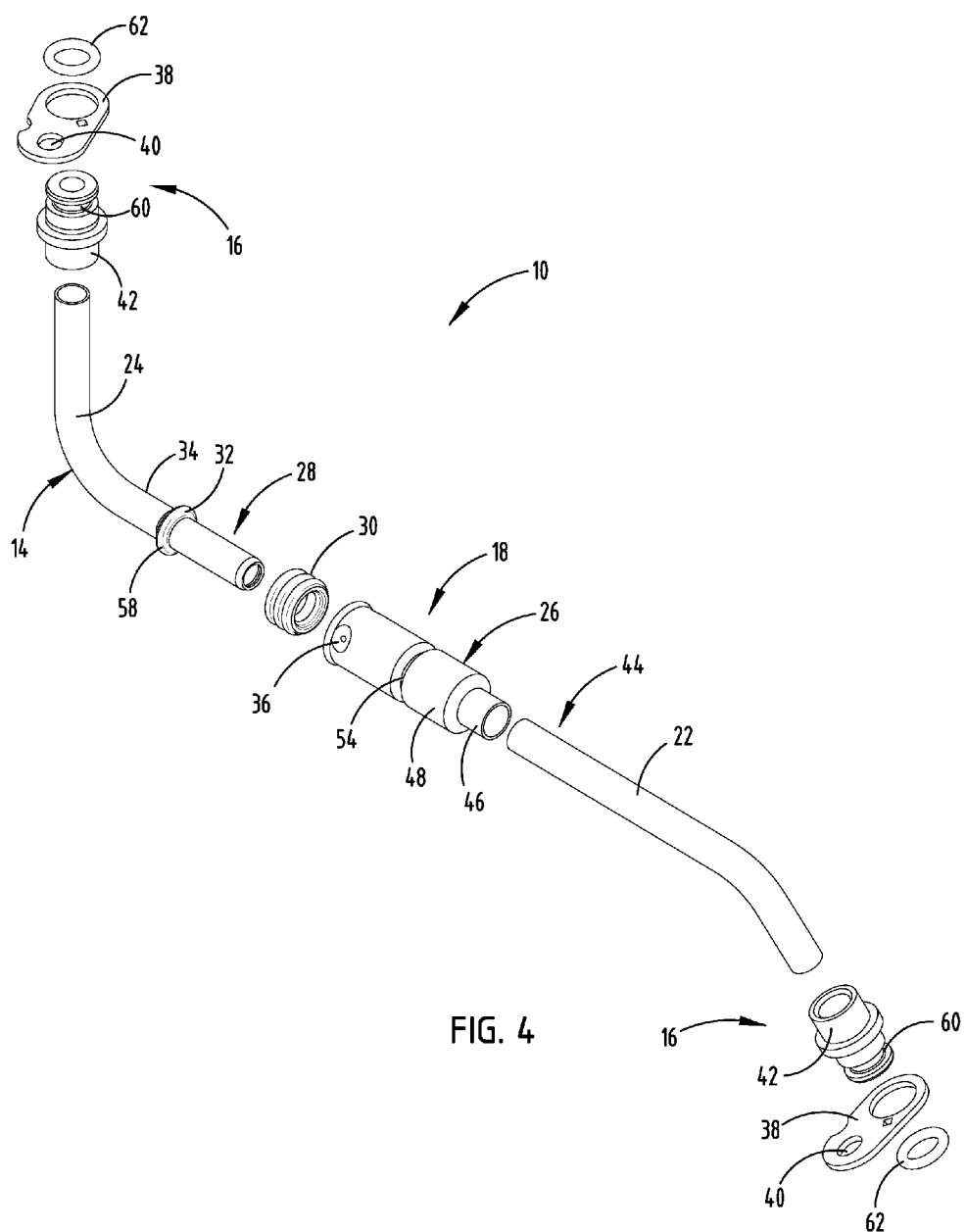
FIG. 4 is an exploded top perspective view of the vehicle fluid line of FIG. 2.

As shown in FIGS. 4-5, the illustrated embodiment of the catch feature 36 includes three indentations around the exterior surface of the cylindrical housing 26, which each define a corresponding projection 56 into a cylindrical cavity of the base portion of the housing 26. The projections 56 may be formed to abut the stop feature 32 on the second segment 24 to restrict linear movement beyond the projections 56. It is contemplated that the catch feature may be alternatively configured in additional embodiments of the cylindrical housing 26, such as by crimping the open end 52 of the housing 26, folding tabs over the edge of the housing 26 into the cylindrical cavity, and other conceivable protruding catch features that are configured to abut the stop feature 32 on the end portion 28 of the second segment 24 for preventing disengagement of the second segment 24 from the housing 26. Furthermore, if sufficient shipping and assembly safeguard exist such that the second segment 24 is prevented from disengaging from the housing 26, the catch feature 36, in one embodiment, may be omitted from the adjustable joint 18.

As illustrated in FIG. 4, the second segment 24 of the rigid pipe 14 shows the stop feature 32, which includes a continuous protrusion 58 extending from an exterior surface of the end portion 28 and surrounding the circumference of the end portion 28. In the illustrated embodiment, as also shown in FIG. 6, the continuous protrusion 58 is formed by integrally forming the continuous protrusion 58 as a fold in the end portion 28 of the second segment 24. However, it is contemplated that the protrusion may be alternatively fixedly coupled with the exterior surface of the second segment 24, such as by welding, brazing, or thermal shrink-fitting, to maintain a seamless interior surface of the end portion 28 of the second segment 24 for preventing displacement that may occur during the fluid system pressurization or vacuum. It is also conceivable that the stop feature 32 may not extend entirely around the circumference of the end portion 28 such that the stop feature 32 may be segmented protrusions spaced around the end portion 28.

The opposing ends 16 of the vehicle fluid line 10, as illustrated in FIG. 4, include the fitting couplings 42 that are rigidly coupled with the opposing ends 16 of the first and second segments 22, 24 of the rigid pipe 14. The fitting couplings 42 are generally cylindrically shaped with a larger diameter than the generally consistent outside diameter of the rigid pipe 14 and include the attachment bracket 38 for fastening the couplings to the respective engine component. A circumferal crevice 60 is formed entirely around and proximate to the distal end of the fitting couplings 42 for receiving a gasket 62 therein to provide the fluid seal between the rigid pipe 14 and the respective engine component. The fitting couplings 42 may be attached to the opposing ends 16 of the first and second segment 22, 24 with cementing compounds, adhesives, friction welding, brazing, thermal shrink-fitting, or other means of attachment, as generally understood by one skilled in the art. It is also conceivable that the opposing ends 16 of the vehicle fluid line 10 may be of another variety of rigid fixed design, such as banjo bolts, bracketed PIP seals, methods of roll forming geometry, and other portions integrally formed into the tube 22, 24.

Referring now to FIG. 6, the elastomeric grommet 30 is disposed between the outer diameter 34 of the end portion 28 and the inner diameter 50 of the body portion 48 (FIG. 4) of the cylindrical housing 26. The elastomeric grommet 30 is contained on the end portion 28 of the second segment 24 between the stop feature 32 and the seal stop 54, which protrudes into the cylindrical cavity of the housing 26. The elastomeric grommet 30 has a plurality of ribs 64 extending in generally parallel alignment around the circumference of the elastomeric grommet 30. In the illustrated embodiment, the elastomeric grommet 30 has three ribs 64 that are interconnected by webbing, such that the elastomeric grommet 30 provides three separate fluid seals between the end portion 28 of the second segment 24 and the cylindrical housing 26, thereby providing increased protection from contamination and allowing longitudinal sliding, angular pivoting, and rotational movement of the second segment 24 relative to the housing 26 while maintaining the fluid seal. It is contemplated that the elastomeric grommet 30 may have a different number of ribs 64 depending upon the sizing of the tube inner and outer diameters, operational pressures, and elastomeric material properties.

In assembling the adjustable joint 18, the cylindrical housing 26 is fixedly coupled with the end of the first segment 22 and the protrusion is similarly rigidly coupled with the end portion 28 of the second segment 24 using attachment means such as welding, brazing, thermal expansion and shrink-fitting, friction welding, adhesives and/or cementing compounds, and additional attachment means as generally understood in the art, and combinations thereof. It is also conceivable that the cylindrical housing 26 could be formed into the base tube 22. The elastomeric grommet 30 is then seated around the end portion 28 of the second segment 24 and the second segment 24 is then inserted into the cylindrical cavity of the housing 26 until the elastomeric grommet 30 abuts the seal stop 54. The elastomeric grommet 30 may alternatively be inserted into the housing 26 in abutting contact with the seal stop 54 and then the end portion 28 of the second segment 24 may be inserted coaxially into the cylindrical cavity of the housing 26 into engagement with the elastomeric grommet 30 and abutting the protrusion thereon with the elastomeric grommet 30. Once attaining this position, the catch feature 36 is formed by crimping, bending, or otherwise forming protrusions into the cylindrical cavity of the housing 26 to prevent disengagement of the elastomer grommet and disengagement of the end portion 28 of the second segment 24 from the housing 26.

As illustrated in FIG. 7, the adjustable joint 18 allows the length 20 (FIG. 6) of the rigid pipe 14 to be extendable telescopically from a first length 66 having the stop feature 32 interfacing with the seal stop 54 and a longer second length 68 with the stop feature 32 interfacing with the catch feature 36. More specifically, in the illustrated embodiment, the stop feature 32 directly abuts the catch feature 36, defining the second length 68, while the first length 66 is defined by the stop feature 32 abutting the elastomeric grommet 30 and the elastomeric grommet 30 directly abutting the seal stop 54. The distance between the first and second lengths 66, 68 defines the range of longitudinal movement between the first and second segments 22, 24 of the rigid pipe 14.

Figure 8:
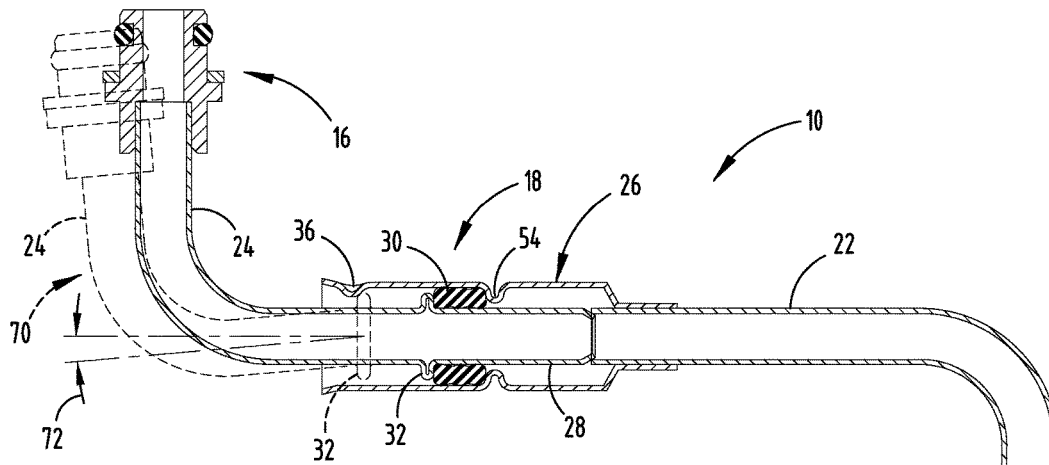
FIG. 8 is a cross-sectional side view of the vehicle fluid line of FIG. 6, showing angular adjustment about an adjustable joint of the vehicle fluid line.

Also, as illustrated in FIG. 8, the elastomeric grommet 30 of the adjustable joint 18 allows the first segment 22 to angularly pivot relative to the second segment 24. As shown, the longitudinal axis of the second segment 24 may angularly pivot from a generally coaxial orientation or an offset axial orientation to an angled position 70, defining a range of angular movement 72. In the illustrated embodiment, contact between stop feature 32 and the housing 26 prevents further angular movement. It is also conceivable that the end portion 28 may contact the housing 26 or the seal stop 54 to prevent further angular movement. Again, the elastomeric grommet is configured to maintain a fluid seal between the first and second segments upon such pivoting angular movement.

Figure 9:
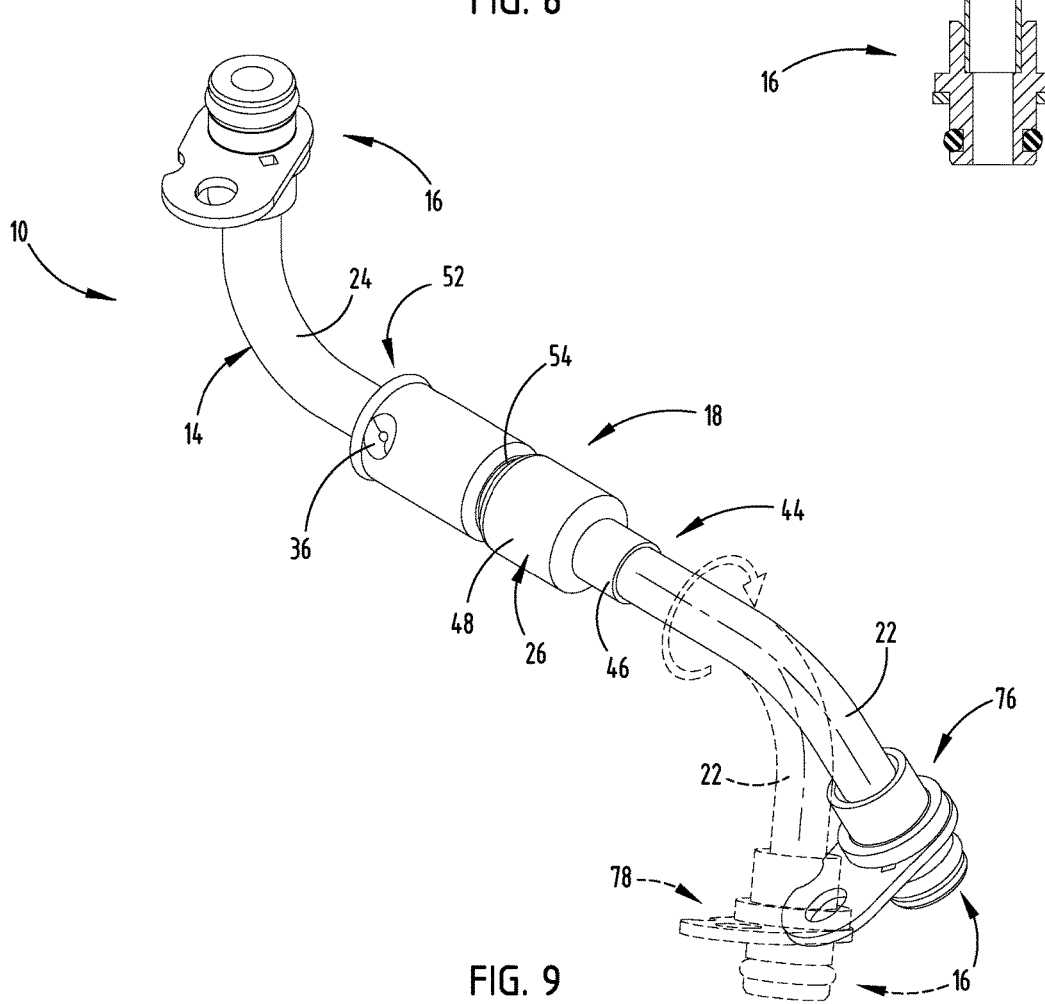
FIG. 9 is a top perspective view of the vehicle fluid line, showing rotational adjustment of the vehicle fluid line about the adjustable joint.

Further, axial rotatable movement of the adjustable joint 18, as shown in the embodiment of FIG. 9, is provided between the first and second segments 22, 24. The first segment 22 may rotate relative to the second segment 24 about a common longitudinal axis and at any adjusted length and at any angular adjustment, such that the end portion 28 is permitted to rotate a full 360 degrees within the housing 26, and at least between a first rotated position 76 and a second rotated position 78, as shown in FIG. 9. Accordingly, rotational movement of the second segment 24 relative to the housing 26 may cause the elastomeric grommet 30 to similarly rotate with the second segment 24, although, in some embodiments, the elastomeric grommet 30 may also remain fixed relative to the housing 26 upon rotation of the second segment 24 within the housing 26.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle fluid line for transporting pressurized fluids of an engine, comprising:
   a rigid pipe having opposing ends configured to fixedly couple with the engine;
   an adjustable joint dividing a length of the rigid pipe into first and second segments and comprising:
     a cylindrical housing coupled with the first segment and having an inner diameter and a seal stop protruding transversely inward from the inner diameter and separated from the second segment by a first gap;
     a stop feature transversely protruding from an outer diameter of the second segment that interfaces with the cylindrical housing to prevent disengagement of the second segment from the housing, wherein the stop feature is separated from the housing by a second gap such that an orientation of the first segment to the second segment is axially variable;
     a catch feature protruding radially inward from the inner diameter that is configured to interface with the protrusion for preventing disengagement from the housing, wherein the seal stop protrudes radially inward from the inner diameter on an opposite side of the stop feature from the catch feature; and
     an elastomeric grommet seated between the inner and outer diameters that is configured to maintain a fluid seal and allow the second segment to rotate and slide longitudinally within the cylindrical housing.

2. The vehicle fluid line of claim 1,
   wherein the seal stop is configured to interface with the protrusion for preventing over-insertion of the second segment into the housing.

3. The vehicle fluid line of claim 2, wherein the rigid pipe is extendable from a first length having the stop feature interfacing with the seal stop and a longer second length with the stop feature interfacing with the catch feature, defining a range of longitudinal movement between the first and second segments.

4. A vehicle fluid line, comprising:
   a rigid pipe;
   a fluid sealed, adjustable joint dividing a length of the rigid pipe into first and second segments and comprising:
     a housing coupled with the first segment;
     an end portion of the second segment slidably and rotatably engaged within the housing, wherein the first segment is angularly variable to the second segment; and
     a protrusion on the end portion and a catch on the housing that interface, wherein the end portion extends into the housing beyond the protrusion and the catch includes a plurality of non-continuous projections extending towards the second segment.

5. The vehicle fluid line of claim 4, wherein the end portion is coaxially arranged within a cylindrical interior cavity of the housing.

6. The vehicle fluid line of claim 4, wherein the end portion includes a tubular shape and is an integral piece of the second segment of the rigid pipe.

7. The vehicle fluid line of claim 4, wherein the catch protrudes radially inward from an outer edge of the housing and is configured to abut the protrusion for limiting slidable movement within the housing.

8. The vehicle fluid line of claim 4, further comprising:
   a grommet disposed between the end portion and the housing that is configured to maintain a fluid seal between the first and second segments upon slidable and rotatable movement of the end portion with the housing, wherein the grommet includes a plurality of ribs thereon.

9. The vehicle fluid line of claim 4, wherein a distance between the first and second segments is linearly extendable from a first length having the protrusion abutting the catch and a shorter second length with the stop feature longitudinally spaced from the catch feature and contained within the housing.

10. The vehicle fluid line of claim 4, wherein the housing includes a seal stop protruding radially inward from an interior diameter of the housing on an opposite side of the protrusion from the catch, together with the catch defining a range of longitudinal movement between the first and second segments.

11. The vehicle fluid line of claim 10, further comprising:
    an elastomeric grommet disposed around the end portion between the protrusion and the seat stop forming a fluid seal between the end portion and the housing that is configured for telescoping, angular, and rotational movement of the end portion within the housing.

12. A vehicle fluid line, comprising:
    first and second segments of a rigid pipe;
    a housing coupled with the first segment;
    a second segment slidably engaged within a housing cavity;
    a grommet having a plurality of ribs on opposing surfaces disposed between the second segment and the cavity forming a seal; and
    a protrusion on the second segment preventing disengagement from the housing, wherein the grommet is longitudinally disposed between the protrusion and the first segment.

13. The vehicle fluid line of claim 12, wherein the second segment is coaxially engaged within a cylindrical cavity of the housing and includes a chamfered end that may be disposed within the first segment.

14. The vehicle fluid line of claim 13, wherein the second segment includes a tubular shape and is an integral piece of the second segment.

15. The vehicle fluid line of claim 12, further comprising:
    a catch feature protruding radially inward and into the cavity that is configured to abut the protrusion for preventing disengagement from the housing and for limiting slidable movement therein.

16. The vehicle fluid line of claim 15, wherein the catch feature includes a plurality of non-continuous indentations around an exterior surface of the housing defining a corresponding plurality of projections on the cavity.

17. The vehicle fluid line of claim 15, further comprising:
a seal stop protruding radially inward from the cavity on an opposite side of the protrusion from the catch feature that is configured to interface with the protrusion for preventing over-insertion of the second segment into the housing.

18. The vehicle fluid line of claim 17, wherein the seal stop includes a continuous ridge extending around the cylindrical cavity defining an opening slightly greater than a diameter of the second segment.

19. The vehicle fluid line of claim 17, wherein the seal stop is configured to restrict longitudinal sliding movement of the grommet beyond the seal stop and permit longitudinal sliding movement of the second segment beyond the seal stop.

20. The vehicle fluid line of claim 17, wherein a distance between the first and second segments is linearly extendable from a first length having the protrusion interfacing with the seal stop and a longer second length with the protrusion interfacing with the catch feature.

* * * * *